United States Patent Office 3,814,753
Patented June 4, 1974

3,814,753
MONOMETHYLOL AND DIMETHYLOL TRIAZONE SULFAMIC ACID, AND SALTS THEREOF
Andrew A. Kasper, Watertown, Mass., assignor to The Kendall Company, Walpole, Mass.
No Drawing. Filed Apr. 11, 1972, Ser. No. 243,081
Int. Cl. C07d 55/12
U.S. Cl. 260—242
14 Claims

ABSTRACT OF THE DISCLOSURE

Monomethylol and dimethylol triazone sulfamic acid and the sodium, potassium, lithium, calcium, magnesium, zinc, aluminum and ammonium salts thereof are disclosed. Compositions containing the salts and acidic catalysts impart creaseproofing properties to cellulosic textiles.

This invention relates to monomethylol and dimethylol triazone sulfamic acid, to certain salts thereof, to creaseproofing compositions for cellulosic textiles containing said salts, and to creaseproofed cellulosic textiles. More particularly, this invention relates to compounds having the formua

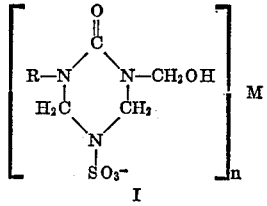

wherein R is hydrogen or methylol; M is hydrogen, a cation of sodium, potassium, lithium, calcium, magnesium, zinc or aluminum, or an ammonium ion; and $n$ is 1 where M is hydrogen or an integer equal to the valence of M where M is one of the aforementioned ions; and to crease-proofing compositions comprising compound I where M is other than hydrogen and an acidic catalyst.

Various substituted triazones and their use as creaseproofing agents have been previously prepared and described in the literature. Thus, U.S. Pat. 2,231,989 discloses 1,3-bis(alkoxymethyl) triazones having a monovalent aliphatic hydrocarbon radical at the -5 position, while U.S. Pats. 2,901,463 and 3,246,946 described 1,3-dimethylol triazones having alkyl or certain hydroxyalkyl substituents at the -5 position.

While these materials do function as creaseproofing agents, they possess certain disadvantages which have precluded their widespread commercial acceptance. Thus, their use often results in tensile, tear and abrasion loss in the fabric, while making it impossible to remove creases from garments made from the treated fabric.

Now it has been found in accordance with this invention that monomethylol and dimethylol triazone derivatives having the formula I can be prepared, and that compositions comprising the salts included in formula I confer excellent creaseproofing properties on cellulosic textile fabrics.

More in detail, compounds I are prepared by reacting trimethylol or tetramethylol urea with sulfamic acid or the appropriate sulfamic acid salt, the cation of the salt being M in formula I. Reaction with trimethylol urea provides compounds I where R is hydrogen, while the use of tetramethylol urea yields compounds I where R is methylol.

The aforementioned methylol ureas are known compounds which can be readily provided by reacting urea with aqueous formaldehyde (or paraformaldehyde or trioxane) in the presence of a base such as an alkali metal hydroxide. The molar ratio of formaldehyde to urea should be at least 3:1 to provide trimethylol urea and at least 4:1 to provide tetramethylol urea; preferably a 5 to 10% molar excess of formaldehyde is employed. Temperatures from about 0° to 100° C., and preferably from 15° to 25° C. can be used. The sulfamic acid salt is provided by reacting sulfamic acid with the appropriate metal salt, such as a carbonate, in water at a temperature of 15° to 30° C.

Then the tri- or tetramethylol urea is reacted with sulfamic acid or the sulfamic acid salt at a temperature of from −10° to +5° C. for the acid or 20° to 40° C. for the salt to provide the desired compound I. Preferably the reaction is carried out without isolating the reactants. Thus, the aqueous tri- or tetramethylol solution and the sulfamic acid or aqueous sulfamic acid salt solution are reacted, employing the proper stoichiometric amounts. For example, where M in formula I is a divalent cation, at 2:1 molar ratio of tri- or tetramethylol urea to sulfamic acid salt is employed.

The desired product can be obtained without forming tri- or tetramethylol urea as a first step. Thus, the urea and formaldehyde can be partially reacted and sulfamic acid or sulfamic acid salt added, the reaction to provide compound I occurring through reaction of partially methylolated urea with the sulfamic acid or salt thereof followed by further reaction with formaldehyde.

While any compound having the formula I can be prepared, preferred compounds are the dimethylol derivatives, that is, compounds I wherein R is methylol.

Compounds I are readily obtained in good yields and, if desired, can be isolated from the reaction mixture by conventional techniques such as removal of water under vacuum conditions. However, for use in the creaseproofing compositions of this invention, the salts included in formula I are preferably utilized in their reaction mixtures, without isolation.

As previously indicated, the salts included in formula I are valuable creaseproofing agents. The monomethylol and dimethylol triazone sulfamic acids are useful as intermediates in the preparation of salts I. Thus, the acids are reacted with an appropriate base, the cation of the base being M in formula I, to provide the desired salt.

The creaseproofing composition of this invention comprises an aqueous solution of at least one of the salts included in formula I and an acidic catalyst. Suitable catalysts include Lewis acid catalysts, such as boron trifluoride, zinc nitrate, zinc chloride, ammonium chloride, magnesium chloride, triethylamine hydrochloride, pyridine hydrochloride, benzyldimethylamine oxalate, aluminum dihydrogen phosphate, etc.

The composition comprises from about 2.8 to about 20% by weight of salt I and a catalytic amount of acidic catalyst. Generally, about 2.0 to about 5% by weight of catalyst is required. Preferably, from about 8 to about 10% of salt I and from about 2.5 to about 3% of acidic catalyst is employed.

Optionally, the creasproofing compositions of this invention can contain one or more aminoplast resins. For example, water-soluble condensates of formaldehyde with melamine, urea, N,N'-ethyleneurea or N,N'-trimethyleneurea may be employed. Exemplary aminoplast resins are those disclosed in Belgium Patent 684,311, which is hereby incorporated by reference in its entirety. Particularly preferred is dimethylol dihydroxyethylene urea. When used, the aminoplast resin is employed in an amount from about 1.5 to 7.5% by weight, and preferably from about 2.0 to 2.5% by weight of the creaseproofing composition.

Furthermore, the creaseproofing compositions of this invention can contain softeners such as emulsions of polyacrylates, silicone derivatives, polyolefins, etc. A typical emulsion is the high-density polyolefin emulsion sold by Onyx Chemical Company, Division of Millmaster Onyx Corporation, 190 Warren Street, Jersey City, New Jersey, under the name "Polysan ABR." An amount of 1.0 to 3.0% by weight, and preferably 1.25 to 1.50% by weight of the creaseproofing composition can be used. The emulsion can be used as the only optional ingredient, or it can be used in combination with an aminoplast resin.

The creaseproofing compositions of this invention are applied to cellulosic textile substrates. By the term "cellulosic textile substrates" in the claims and specification herein is meant substrates containing at least 10% by weight cellulosic fibers and includes cotton, rayon and blends thereof with other fibers such as polyester, acrylic and polyamide fibers. The substrates may be in the form of fabrics which have been made by knitting, weaving, etc.

In applying the creaseproofing composition, it is preferred to immerse the cellulosic textile substrate in the composition, excess composition being removed by squeezing until the weight of the wetted substrate is preferably no more than double that of the untreated dry substrate. Other methods of application, such as spraying, immersion, etc. can also be used. Independent of the method of application, the critical factor is the amount of compound I that is applied to the wet substrate. This amount is preferably in the range of about 8 to 20% by weight of the dry untreated substrate for 100% cotton or rayon, about 4 to 10% by weight for 50/50 cotton polyester or rayon polyester blends and about 2.8 to 7% by weight for 65/35 polyester cotton or polyester rayon blends. The substrate is then dried, for example, by heating at 100° C., and cured at temperatures ranging from 100° to 150° C. and preferably from 120° to 140° C.

Alternately, the substrate can be treated with the creaseproofing composition of this invention and dried without curing. Thereafter the substrate can be made into garments, after which the compound I can be cured during the pressing operation or in a separate step.

While we do not desire to be bound by theory, it is believed that curing occurs through reaction of the cellulosic hydroxyl groups with the methylol groups in compound I to form covalent crosslinks and additionally by the formation of ionic bonds due to the presence of metallic ions in the composition.

The creaseproofed fabrics prepared with the compositions of this invention have many desirable characteristics. The ionic groups enhance the hydrophilicity of the substrate and hence the soil release properties. Furthermore, the presence of predominantly ionic crosslinking bonds in some of the fabrics, such as those treated with the monomethylol compounds I, indicates that creases may be destroyed and reformed. Thus, the fabric may be padded with sodium chloride solution, dried and washed to remove the salt containing the metal cation present in the creaseproofing composition. Then the fabric may be padded with a household salt preparation such as magnesium sulfate and dried to form a new crease.

Another advantage of this invention is that treated 100% cotton fabrics have less tensile and tear loss than that which usually accompanies the incorporation of crosslinks via the conventional reactant systems, while treated blends show no loss or better tensile and tear properties.

The following examples will serve to illustrate the practice of this invention.

EXAMPLE 1

A. Preparation of sodium 2,6-dimethylol-4-sulfo triazone

1. A stock 37% aqueous formaldehyde solution was titrated for free formaldehyde acording to the sodium sulfite procedure described in Formaldehyde, J. F. Walker, pp. 257–258 (1944), Reinhold Publishing Corp., New York, and found to contain 36.9% by weight formaldehyde.

Urea (60.0 g.; 1.0 mole) was added stepwise over 15 seconds, at room temperature, to the well stirred 36.9% aqueous formaldehyde solution (330 ml.; 4.4 moles formaldehyde). The temperature of the resulting solution dropped to 8–10° C.; the pH of the solution was 3.8–4.3. To the solution was added 50% aqueous sodium hydroxide until the pH was raised to 12.0. An exotherm developed and the temperature of the reaction solution increased to 43°–47° C. The solution was covered and stirred overnight to provide a clear, rather viscous solution having a pH of 7.0±0.3.

2. Sodium sulfamate was prepared by adding sodium carbonate stepwise to a stirred solution of sulfamic acid (97.0 g.; 1 mole) in 100 ml. water until a pH of 7.0 was attained; a total of 53.0 g. of sodium carbonate (0.5 mole) was added.

3. The pH of the solution prepared in part 1 was adjusted to 4.0 with phosphoric acid and the entire sodium sulfamate solution described in part 2 was added thereto with mixing; about 45 hours had elapsed since the addition of urea to formaldehyde in part 1. An exotherm of 5°–10° was observed. After stirring for two hours, the system returned to room temperature.

Approximately 67 hours after the urea-formaldehyde addition in part 1, a 3 ml. aliquot was removed from the reaction mixture and titrated for free formaldehyde following the previously cited sodium sulfite procedure; the mixture was found to contain 2.48% free formaldehyde. Considering the dilution effect which occurred upon each addition of a reactant during the procedure, a loss of free formaldehyde of 22.4% by weight was calculated. Thus, if none of the formaldehyde had reacted, the solution would have contained 24.9% formaldehyde. This was equivalent to the presence of 100% of expected bound formaldehyde in the reaction mixture, confirming that sodium 2,6-dimethylol-4-sulfotriazone had been obtained. The mixture had a solids content of 40% by weight.

B. Preparation of creaseproofing composition

The amount of 50 ml. of the sodium 2,6-dimethylol-4-sulfotriazone solution prepared in part A was mixed with 15 ml. of Permafresh 183, a 45% by weight aqueous solution of dimethylol dihydroxyethylene urea marketed by Sun Chemical Company, P.O. Box 470, Chester, South Carolina, and water added to bring the mixture to 100 ml. Concentrated phosphoric acid was added dropwise, with stirring, until the pH of the mixture was 2.8–3.0. Then 10 ml. of Alkophos C (a 50% by weight aqueous solution of aluminum dihydrogen phosphate sold by Monsanto Chemical Company) was diluted with 90 ml. of water, with stirring, and ammonium carbonate added to bring the pH to 2.4–2.6. The Alkophos C solution was mixed with the solution of dimethylol triazone sodium sulfamate and Permafresh 183, 10 ml. of Polysan ABR (a 33% by weight solids aqueous high density polyolefin emulsion sold by Onyx Chemical Company, Jersey City, New Jersey) added, and the volume adjusted with water to 250 ml.

C. Application of finish

Pieces of cotton poplin, a 50/50 polyester cotton blend, and a 65/35 polyester cotton blend were padded with the creaseproofing composition of part B. The composition was used as is for the poplin, diluted 1:1 with water for the 50/50 blend and diluted 1:2 with water for the 65/35 blend. The poplin and 50/50 blend were padded to 100% wet pick-up and the 65/35 blend to 60–65% wet pick-up. After squeezing, the impregnated fabric was pinned on a frame and dried and cured at 135°–140° F. for 3 minutes in a circulating air oven. The cured fabric was then washed in hot water (165° F.) in Tide detergent and tumble dried in a home dryer. After equilibration at 70° F. and 65% relative humidity overnight, the permanent add-on (percent increase in weight of fabric resulting from the treatment) was determined. The fabric was evaluated for Tensile following ASTM Test Method D1682–64 (Reapproved 1970) employing 7 inch by 1 inch ravelled strips and Instron crosshead and chart speeds of 5 inches per minute. Tear was evaluated by the Tongue (Single Rip) Method in accordance with ASTM Method D2261–71. Crease recovery was evaluated by measuring dry and wet angles following the procedure for dry angles outlined in AATCC Tentative Test Method 66–1959T; for wet angles the die cut standard strips were first immersed overnight in a large volume of distilled water and blotted to remove excess water prior to testing. The results are reported in the table.

EXAMPLE 2

Zinc sulfamate was prepared by adding zinc oxide (41 g.; 0.5 mole) stepwise, with stirring, to a solution of sulfamic acid (97 g.; 1 mole) in 100 ml. water.

A solution prepared exactly as described in Example 1, part A(1) was adjusted to a pH of 3.0 with phosphoric acid and the entire zinc sulfamate solution described previously added thereto; about 24 hours had elapsed since the addition of urea to formaldehyde in the preparation of the solution according to Example 1, part A(1). An exotherm of 5°–10° was observed. After stirring for two hours, the system returned to room temperature.

Approximately 48 hours after the addition of urea to formaldehyde, a 3 ml. aliquot was removed from the reaction mixture and titrated for free formaldehyde following the procedure described in Example 1; the mixture was found to contain 1.66% free formaldehyde. Considering the dilution effect which occurred upon each addition of each reactant during the procedure, a loss of free formaldehyde of 14.54% by weight was calculated. This was equivalent to the presence of 100% bound formaldehyde in the reaction mixture, confirming that zinc di(2,6-dimethylol-4-sulfotriazone) had been obtained. The mixture had a solids content of 30% by weight.

A creaseproofing composition was prepared following the procedure and employing the ingredients and amount of Example 1(B) but substituting 60.0 ml. of zinc di(2,6-dimethylol-4-sulfotriazone) solution for the corresponding sodium solution of Example 1. After padding and curing, properties were determined as in Example 1; the results are set forth in the table.

Another creaseproofing composition was prepared exactly as described in the preceding paragraph but omitting the Permafresh 183; the properties of poplin after padding with this composition and curing as described in Example 1, are given in the table as Example 2(A).

EXAMPLE 3

Lithium sulfamate was prepared by adding 36.9 g. (0.5 mole) of lithium carbonate to a solution of sulfamic acid (97 g.) in 100 ml. water.

A solution prepared exactly as described in Example 1, part A(1) was adjusted to a pH of 4.0 with phosphoric acid and the entire lithium sulfamate solution prepared above added thereto. An exotherm of 5° to 10° was observed; after stirring for 2 hours, the system returned to room temperature. A 26% solids solution of lithium 2,6-dimethylol-4-sulfotriazone solution was obtained.

A creaseproofing composition was prepared following the procedure and employing the ingredients and amount of Example 1(B), but substituting 50.0 ml. of lithium 2,6-dimethylol-4-sulfotriazone solution for the corresponding sodium solution of Example 1. After padding and curing properties were determined as in Example 1; the properties are set forth in the table.

EXAMPLE 4

Calcium sulfamate was prepared from 50 g. (0.5 mole) calcium carbonate and sulfamic acid (97 g.) in 100 ml. water.

Employing the procedure and ingredients of Example 3, paragraph 2, but substituting the calcium sulfamate solution prepared above for lithium sulfamate, a 30% solids solution of calcium di(2,6-dimethylol-4-sulfotriazone) was obtained.

A creaseproofing composition was prepared following the procedure and employing the ingredients and amount of Example 1(B), employing calcium di(2,6-dimethylol-4-sulfotriazone) solution as the sulfamate solution. After padding and curing, properties were determined as in Example 1; the properties are set forth in the table.

A creaseproofing composition exactly as described above but omitting the Permafresh was prepared. The properties of poplin after padding with this composition and curing as described in Example 1 are given in the table as Example 4(A).

EXAMPLE 5

Magnesium sulfamate was prepared from 42 g. (0.5 mole) magnesium carbonate and sulfamic acid (97 g.) in 100 ml. water.

Employing the procedure and ingredients of Example 3, paragraph 2, but substituting the magnesium sulfamate solution prepared above for lithium sulfamate, a 30% solids solution of magnesium di(2,6-dimethylol-4-sulfotriazone) was obtained.

A creaseproofing composition was prepared following the procedure and employing the ingredients and amount of Example 1(B), employing magnesium di(2,6-dimethylol-4-sulfotriazone) solution as the sulfamate solution. After padding and curing, properties were determined as in Example 1; the properties are set forth in the table.

A creaseproofing composition exactly as described above but omitting the Permafresh was prepared. The properties of poplin after padding with the composition and curing as described in Example 1 are given in the table as Example 5(A).

EXAMPLE 6

Ammonium sulfamate was prepared from 48.0 g. (0.5 mole) ammonium carbonate and sulfamic acid (97 g.) in 100 ml. water.

Employing the procedure and ingredients of Example 3, paragraph 2, but substituting the ammonium sulfamate solution prepared above for lithium sulfamate, a 30% solids solution of ammonium 2,6-dimethylol-4-sulfotriazone was obtained.

A creaseproofing composition was prepared following the procedure and employing the ingredients and amount of Example 1, B, employing ammonium 2,6-dimethylol-4-sulfotriazone solution as the sulfamate solution. After padding and curing, properties were determined as in Example 1; the properties are set forth in the table.

EXAMPLE 7

Aluminum hydroxide was prepared by precipitation from a solution of hydrated aluminum nitrate (375 g.; 1.0 mole) in hot water employing ammonia as the precipitating agent. The precipitate was washed with hot water, allowed to settle overnight and suction filtered. Then it was dissolved in 850 ml. of 2 N sulfamic acid, reprecipitated with ammonium hydroxide, washed with hot water and suction filtered. Ninety percent of the resulting washed cake was added to 600 ml. of 2 N sulfamic acid required to prepare aluminum trisulfamate. After stirring well for five minutes, three 50 ml. portions of the 2 N acid and the rest of the aluminum hydroxide were added; the pH of the solution was 3.4–3.5. After filtration to remove a trace of aluminum hydroxide, one liter of 0.5 molar aluminum sulfamate solution was obtained.

After adjusting the pH to 3.0 with phosphoric acid, the entire aluminum sulfamate solution was added to 580 ml. of a solution prepared according to Example 1, part A(1), which had been acidified to a pH of 3.0. Upon stirring the reaction mixture, an exotherm of 10° was observed. After one hour, 17% by weight solution of aluminum tri(2,6-dimethylol-4-sulfotriazone) was obtained.

A creaseproofing composition was prepared following the procedure and employing the ingredients and amount of Example 1(B), but substituting 60.0 ml. of the above aluminum tri(2,6-dimethylol-4-sulfotriazone) solution for the corresponding sodium solution of Example 1. After padding and curing, properties were determined as in Example 1; the results are set forth in the table.

Another creaseproofing composition was prepared exactly as descriged in the preceding paragraph but omitting the Permafresh 183; the properties of poplin after padding with this composition and curing as described in Example 1 are given in the table as Example 7(A).

EXAMPLE 8

Sulfamic acid (97.1 g.; 1.0 mole) was added in small increments over a period of 30 minutes to a well stirred 36.9% aqueous formaldehyde solution 170 ml., 2.2 moles formaldehyde) chilled to 0° C. Stirring was continued for an additional 30 minutes to provide a solution of dimethylol sulfamic acid.

Urea (60 g.; 1.0 mole) was added at room temperature to a well stirred 36.9% aqueous formaldehyde solution (170 ml.; 2.2 moles). To the resulting solution of dimethylol urea was added 50% aqueous sodium hydroxide until the pH was raised to 10.5–12.5. After stirring, the pH of the system was adjusted to 3.0 with phosphoric acid and the temperature adjusted to 15°–25° C.

The entire dimethylol urea solution was added to the cold, well stirred dimethylol sulfamic acid solution. An exotherm was observed and the temperature ranged from 17° to 25° C. during ½ hour of stirring to provide hydrogen 2,6-dimethylol-4-sulfotriazone.

EXAMPLE 9

Sodium sulfamate was prepared by adding sulfamic acid (107 g.; 1.1 mole) stepwise to a stirred solution of 88 g. of 50% aqueous sodium hydroxide in 100 ml. of water. There was a large exotherm but no boiling. After completion of the addition, the solution was stirred, cooled to room temperature and the pH adjusted to 3.0 with phosphoric acid.

Trimethylol urea was prepared by adding urea (66 g.; 1.1 mole) to a well stirred 36.9% aqueous formaldehyde solution (255 ml.; 3.3 moles formaldehyde). After about 5 minutes, the pH of the solution was raised to 12.5 with 50% aqueous sodium hydroxide and stirring continued for about 4 hours.

The entire trimethylol urea solution was added, with stirring, to the entire sodium sulfamate solution. After stirring overnight at a pH of 3.0, sulfite analysis for free formaldehyde showed the reaction solution to be completely free from unbound formaldehyde, confirming that sodium monomethylol-4-sulfotriazone had been obtained.

TABLE

| Fabric | Example | Percent add-on | Crease recovery, F[1] and W[2] Dry angle, deg. | Crease recovery, F[1] and W[2] Wet angle, deg. | Tensile (lbs.) F[1] | Tensile (lbs.) W[2] | Tear (lbs.) F[1] | Tear (lbs.) W[2] |
|---|---|---|---|---|---|---|---|---|
| 100% cotton | Control | | 170 | 150 | 45 | 58 | 1.3 | 1.4 |
| | 1 | 7.0 | 300 | 320 | 30 | 40 | 1.8 | 1.4 |
| | 2 | 7.3 | 325 | 344 | 23 | 34 | 1.2 | 1.1 |
| | 2(A) | 5.3 | 310 | 325 | 25 | 35 | 1.2 | 1.3 |
| | 3 | 6.5 | 295 | 305 | 28 | 36 | 1.3 | 1.5 |
| | 4 | 6.4 | 305 | 315 | 28 | 46 | 1.6 | 2.1 |
| | 4(A) | 5.2 | 300 | 305 | 37 | 46 | 2.3 | 2.3 |
| | 5 | 8.0 | 325 | 325 | 27 | 38 | 1.5 | 1.5 |
| | 5(A) | 5.6 | 305 | 320 | 32 | 45 | 1.9 | 1.9 |
| | 6 | 7.4 | 300 | 310 | 31 | 46 | 1.7 | 1.9 |
| | 7 | 8.0 | 320 | 325 | 29 | 41 | 1.5 | 1.8 |
| | 7(A) | 5.8 | 295 | 318 | 35 | 49 | 2.5 | 2.1 |
| 50% polyester/50% cotton | Control | | 220 | 210 | 42 | 67 | 5.1 | 5.4 |
| | 1 | 3.3 | 305 | 320 | 42 | 71 | 5.2 | 6.4 |
| | 3 | 3.3 | 305 | 315 | 42 | 75 | 6.0 | 7.2 |
| | 6 | 3.8 | 300 | 310 | 42 | 74 | 6.5 | 6.6 |
| | 7 | 4.2 | 320 | 335 | 43 | 74 | 6.6 | 6.1 |
| | 8 | 6.9 | 295 | 310 | 36 | 50 | 1.8 | 2.1 |
| 65% polyester/35% cotton | Control | | 240 | 230 | 32 | 55 | 2.5 | 4.3 |
| | 1 | 1.6 | 305 | 320 | 30 | 54 | 2.5 | 4.4 |
| | 3 | 2.6 | 305 | 315 | 33 | 65 | 3.0 | 3.8 |
| | 6 | 2.8 | 305 | 315 | 31 | 60 | 3.0 | 3.6 |
| | 7 | 3.1 | 320 | 333 | 31 | 59 | 2.8 | 3.8 |

[1] F=Fill.  [2] W=Warp.

What is claimed is:

1. A compound having the formula

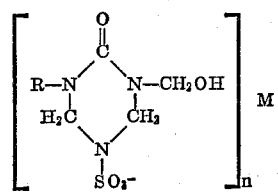

wherein R is hydrogen or methylol; M is hydrogen, a cation of sodium, potassium, lithium, calcium, magnesium, zinc or aluminum, or an ammonium ion; and $n$ is 1 where M is hydrogen or otherwise an integer equal to the valence of M.

2. A compound of claim 1 wherein M is hydrogen.

3. The compound of claim 2 having the name hydrogen 2,6-dimethylol-4-sulfotriazone.

4. A compound of claim 1 wherein M is a cation of sodium, potassium, lithium, calcium, magnesium, zinc or aluminum, or an ammonium ion.

5. A compound of claim 4 wherein R is methylol.

6. The compound of claim 5 having the name sodium 2,6-dimethylol-4-sulfotriazone.

7. The compound of claim 5 having the name zinc di-(2,6-dimethylol-4-sulfotriazone).

8. The compound of claim 5 having the name lithium 2,6-dimethylol-4-sulfotriazone.

9. The compound of claim 5 having the name calcium di(2,6-dimethylol-4-sulfotriazone).

10. The compound of claim 5 having the name magnesium di(2,6-dimethylol-4-sulfotriazone).

11. The compound of claim 5 having the name ammonium, 2,6-dimethylol-4-sulfotriazone.

12. The compound of claim 5 having the name aluminum tri(2,6-dimethylol-4-sulfotriazone).

13. A compound of claim 4 wherein R is hydrogen.

14. The compound of claim 13 having the name sodium monomethylol-4-sulfotriazone.

References Cited

UNITED STATES PATENTS 3,501,467   3/1970   Shay et al. _____ 260—248 NS
3,067,062   12/1962  Etzel _____ 260—248 NS HARRY I. MOATZ, Primary Examiner U.S. Cl. X.R.

260—248 NS; 106—176; 117—139.4